United States Patent [19]

Weiner et al.

[11] 3,961,090

[45] June 1, 1976

[54] METHOD OF PREPARING RARE ROAST BEEF

[75] Inventors: Philip D. Weiner; Jasper J. Kermans, both of Cincinnati, Ohio

[73] Assignee: The E. Kahn's Sons Company, Cincinnati, Ohio

[22] Filed: Feb. 28, 1975

[21] Appl. No.: 554,159

[52] U.S. Cl. ............................. 426/281; 426/412; 426/438; 426/523
[51] Int. Cl.² ........................................... A23L 1/31
[58] Field of Search ............ 426/281, 438, 393, 412, 426/129, 523, 411

[56] References Cited
UNITED STATES PATENTS

| | | | |
|---|---|---|---|
| 3,194,662 | 7/1965 | Nelson | 426/438 |
| 3,216,826 | 11/1965 | Wattenbarger | 426/281 X |
| 3,262,787 | 7/1966 | Ellis | 426/281 |
| 3,607,312 | 9/1971 | Ready | 426/393 |
| 3,663,233 | 5/1972 | Keszler | 426/281 |
| 3,754,302 | 8/1973 | Blair et al. | 426/281 X |
| 3,804,965 | 4/1974 | Peters | 426/523 |
| 3,876,812 | 4/1975 | Peters | 426/523 X |

*Primary Examiner*—Robert L. Lindsay, Jr.
*Assistant Examiner*—Kenneth M. Schor
*Attorney, Agent, or Firm*—J. Warren Kinney, Jr.

[57] ABSTRACT

A piece of uncooked beef in the 10–16 pound range is initially pumped and then vacuum sealed within an oven-ready bag in which it is cooked for a period of time sufficient to provide a uniformly rare condition throughout the entire meat product, and wherein the product meets the Federal standards for a safe product even though the maximum internal temperature of the product does not exceed 140°F.

12 Claims, No Drawings

METHOD OF PREPARING RARE ROAST BEEF

BACKGROUND OF THE INVENTION

1. Field of the Invention

The field of the invention is directed to the art of cooking food products and, in particular, to an unique method of preparing a rare roast beef product.

Description of the Prior Art

U.S. Pat. No. 3,262,787 discloses a process of preparing partially cooked, packaged foods, including beef which, having been stitched instramuscularly, with a solution of gelatin, monosodium glutamate and water, is rubbed with salt, pepper, and garlic and then vacuum sealed in a plastic bag prior to immersion in a tank of hot water which is maintained a 160°F. for 8 hours. The bagged product is then immediately placed in an ice water slurry until the internal temperature of the product reaches 35°F. after which some, or all of the juices are removed from the bag without disturbing the meat product therein. The meat is further cooked when removed from the bag to be served.

U.S. Pat. No. 3,663,233 discloses a method of tenderizing, curing and cooking a meat product, including beef, wherein several discrete pieces of meat are placed in a container and shaped under pressure to acquire a permanent set, after which the contents are impregnated with a salt base or brine solution. The impregnated product is removed from the mold and placed in a plastic bag which is then replaced in a cooking form or container which is then closed. The closed container is immersed in a vat of water having a temperature of 117°–125°F. until the internal temperature of the meat reaches 117°–125°F., in from 9 to 12 hours, for tenderizing the meat. The container is then heated to 148°–165°F. until the meat product is fully cooked. This patent teaches that "cooking" viz "the coagulation of the protein in the beef, commences at approximately 126°F. and accelerates as the temperature is thereafter raised."

After the tenderizing process has been completed, the water in the cooking vat is raised to a temperature in the range of 150°–165°F. until the internal temperature of the meat product attains a temperature of at least 148°F. In Col. 4, lines 51–54, it is stated: "While the meat may be considered by some to be fully cooked at a temperature less than 148°F. most food and health authorities, including the U.S. Government, require a minimum internal temperature of at least 148°F."

U.S. Pat. No. 3,804,965 discloses a method of roasting meat, and discloses a method of preparing "rare" roast beef. In Col. 2, lines 31–42, it is stated that "the roasting temperature, its uniformity, extent and rate of penetration, has a direct and positive effect on the relative relaxation of meat fibers. There are natural collagenase enzymes in beef, which under 140°F. attack and relax (soften and tenderize) the connective cell fibers, which in turn, also helps retain juice within the cells' walls. The higher the temperature over 140°F., the lower the ability of these collagenase enzymes to tenderize the fibers, and the greater the contraction (and hardness and toughness) of the fibers, and the greater the quantity of juices that will be squeezed out of the meat cells."

In Col. 7, lines 40–52, it is stated: "The cooks who wish their beef rare, use the well-known standard temperature guide of 140°F internal temperature (thermometer-inserted reading) in their attempts to achieve the desired 'rareness'. Both the preferences for rareness and the use of the 140° guideline, have firm bases in the known scientific facts that: (1) at the 140°F. line the natural collagenase enzymes are still within a favorable temperature climate to actively attack the tough fibrous connective tissues, while at the same time roasting the meat so it is no longer 'raw'; while as the temperature rises above 140° these enzymes become less active; and that (2) rare beef is measurably higher in flavor, juice, and tenderness."

The disclosed method relates to the step of supporting the meat on a flexible web-like hammock which is sufficiently flexible to permit the web to conform to the natural contour of the meat, and of supporting the web within an oven so that the meat is maintained out of contact with surfaces of the oven while the meat product is subjected to roasting by radiant, dry heat.

U.S. Pat. No. 3,759,722 discloses a method of vacuum packaging uncured red meat within a shrinkable plastic film bag from which the air is expelled and heat shrunk onto the meat product. The film-encased meat product is then ready for storage or display.

U.S. Pat. No. 2,232,767 discloses a process of roasting meat to a rare state by subjecting the meat, during the roasting-process, to super-atmospheric pressure to raise the boiling point of the natural juices in the meat from 212°F. to a substantially higher temperature above 225°F, and preferably 274°–280°F. Said temperatures being effected using cooking oils. The outer surface of the meat is browned by maintaining the fat at a temperature, well over 350°F. to produce an air temperature of over 300°F.

In Col. 4, lines 19–37, it is stated that: "Assume that it is desired to cook a 14.5 pound piece of prime rib of beef to a so-called rare state, as evidenced by the attainment at the centermost point in the piece of meat of 140 dg. F. Conventional standards — require roasting in an ordinary oven for a period of 18–30 minutes per pound, or in other words, for 261–435 mnutes."

The patent teaches that "at these values of temperature and pressure, it has been found that rare cooking of beef combined with thorough surface browning may be achieved in a cooking period of between 5-½–7 minutes per pound or, in other words, about one-fourth of the time required in oven roasting."

The meat product is housed within a pressure vessel into which a charge of water is injected for rapidly creating the desired cooking pressure of 310°F. within the chamber.

SUMMARY OF THE INVENTION

The present invention is directed to a process which enables rare roast beef to be prepared, on a commercial scale, and wherein the resultant product is uniformly rare throughout and safe to eat, being free of objectionable bacteria even though the internal temperature of the meat never exceeds 138°F.

DESCRIPTION OF THE PREFERRED EMBODIMENTS

Federal Regulations, as set forth in Bulletin 664, state that beef cuts which have been pumped with a seasoning in a water based solution and then cooked in an oven bag must be heated to a minimum internal temperature of 145°F in order to be safe for human consumption. However, beef so cooked is not rare and has but little consumer acceptance.

Applicant has determined that an excellent rare roast beef product is attainable having good consumer acceptance when the internal temperature of the product does not exceed 138°F. The difference between 145° and 138°F. raises a question as to whether the applicant's process produces a "safe" product. To resolve this question a series of bacteriological tests were undertaken on rare roast beef processed according to the teachings of the present invention. The results of said tests conclusively established the absolute safety of the rare roast beef produced by the subject process.

Uniformly excellent results have been obtained in those instances in which beef top rounds weighing from 10 to 13¼ pounds and from 13¼–16 pounds are pumped with up to 6% of a solution containing water, salt, dextrose, and monosodium glutamate.

After pumping and draining each piece is deep fat fried in hot (370°F.) fat for 30 seconds to brown and seal the outer surface.

Then, while still warm, the browned surface is rubbed with a spice mixture containing, by way of example, salt, gelatin, dextrose, coloring, monosodium glutamate, pepper, garlic, onions, cloves, celery, and the like. The surface heat of the product serves to melt the gelatin in the spice mixture and thereby enhance adherence of the spices to the surface of the meat which is then placed in an "oven-ready bag", such as, by way of example, is manufactured by the 3M Company under the trademark and designation Scotch Packed Oven Film Roll Type 5009—1 mil thick, after which a vacuum is drawn in the bag for evacuating the air and for disposing the interior surface of the bag in intimate contact with all portions of the outer surface of the meat product. The bag is then suitably "sealed", such as, by way of example, by means of a clip, or the like.

Bag-encased pieces of beef are placed, in spaced relationship, on a rack so that no piece touches another piece, and the rack supporting the bag-encased pieces of the beef is placed in a cooler for a period of up to 12 hours during which and until the internal temperature of all of the bag-encased pieces of meat will have leveled off at temperatures of from 35° to 40°F.

The rack-supported, cooled, bag-encased beef product is then placed in a closed chamber into which live steam is introduced for maintaining a chamber temperature of 162°–165°F. until such time as the internal temperature of the meat products within the chamber reach a temperature of from 126°–134°F. This temperature range is usually attained within a 6 hour period for beef pieces weighing from 10 to 16 pounds. The application of heat to the chamber is then discontinued and, in the preferred embodiment of the invention, the outer surface of the bags are showered with ambient temperature water for a period of time of from 5 to 7 minutes to cool the bag-encased outer or surface-temperature of the meat within the bag by 10°. The having-been-showered, bag-encased meat products are permitted to remain quiescent within the chamber for a period of time ranging from 20–40 minutes during which time the internal temperature of the meat products will increase by another 4° to 6°F. as the latent heat within the meat is dissipated throughout its mass. Therefore, at the end of said quiescent period the internal temperature within the product will have increased to from 130° to 140°F.

In the preferred embodiment of the invention, the internal temperature of the product is heated to 132°F during the application of live steam to the closed chamber, and thereafter the maximum internal temperature which the product will attain, as a result of dissipation of the latent heat throughout the meat product, will be 138°F. The resultant product is a rare, tender, succulent, beautiful pink piece of beef.

During the aforesaid cooking process, juices which are expelled from the meat are retained within the bag. In the preferred embodiment of the invention, the bags of the meat products which have been permitted to attain their maximum internal temperatures are carefully opened, some of the au jus is removed from the bag and a vacuum applied for collapsing the bag around the top of the meat product with the remaining juices in the lower portion of the bag. The bag is then reclipped to again encase the cooked meat product and the juices which were not removed from the bag.

In those instances in which 100 pounds of uncooked meat are initially pumped with 6 pounds of a solution containing water, salt, dextrose, and monosodium glutamate the weight of the beef after having been processed, as aforesaid, approximates 92 pounds with 14 pounds of au jus. Six pounds of the au jus is removed, leaving 8 pounds of au jus in the bags.

The bag-encased cooked product is subjected to blast freezing for initially lowering the internal temperature of the cooked beef to 40°F. and thence to from 0° to 10°F., in which condition the bag-encased cooked meat product is ready for storage and/or distribution, said product having a shelf life of at least 6 months.

It should, of course, be understood that in those instances in which the rare roast beef product is to be used by eating establishments, such as hotels, and the like, wherein it is desirable to have as much au jus as possible, a portion of the au just is not removed from the bags, as aforesaid.

SAFETY OF PRODUCT

In order to demonstrate that internal temperatures of 145°F. are not required in order to provide a safe, in-a-bag-cooked meat product, the following tests were conducted to demonstrate that the slow heat rise within the meat product gives an excellent bacteria kill, as evidenced by the effective thermal death rate of staphylococci and salmonellae pathogens in beef top rounds during the aforesaid cooking process, where the product is heated to various internal temperatures in the 130°–140°F. range.

TEST PROCEDURES

The cure for pumping was inoculated with a mixture of five different cultures of coagulase positive staphylococci (FDA 243, FDA 494, FDA 790, ATCC 6538 and ATCC 25923). The cure was also inoculated with a mixture of four different salmonellae recently isolated from food products. The O and H agglutination reactions were as follows: $C_2Z_4$, E4G complex, $C_1 1$ complex and $C_1Z_{29}$. The cultures were grown overnight in a water bath before inoculating the cure.

Twenty-four top rounds of beef were inoculated such that after pumping they contained $10^3$ to $10^4$ staphylococci per gram and $10^6$ to $10^7$ salmonellae per gram. Thereafter the individual pieces of meat were processed according to the steps heretofore set forth.

After each of the pieces of meat were completely processed, 50 gram samples were removed from the center of each test piece. The samples were blended with dilution water, and the homogenate was then used for tests for staphylococci and salmonellae.

Appropriate dilutions were plated on Baird-Parker agar, in triplicate. Representative colonies were picked after 24 hours incubation and incubated in BHI medium. Coagulase tests were done, using 4 hour incubations in a water bath. Cultures forming characteristics colonies on Baird-Parker agar and giving coagulation after 4 hours in coagulase plasma were designated staphylococci.

Salmonellae were determined by the three tube MPN technique, using pre-enrichment in lactose broth followed by selective enrichment in tetrathionate brilliant green and selenite cystine broths. Plating was done on brilliant green, SS and bismuth sulfite agars. Colonies were confirmed as salmonella by conventional biochemical and serological tests, including both H and O agglutinations.

The results are indicated in the following three tables, I, II, and III. In only one case after processing (sample 8, Table I) was the meat product positive for staphylococci and salmonellae. This occurred in a 11–15 pound piece of beef which attained a maximum internal temperature of but 130°F. All other samples, including those having a maximum internal temperature of 130°F., were negative for staphylococci an salmonellae using the test procedures described.

TABLE I

| Sample | Weight lbs. | oz. | Temperature °F | Salmonella MPN | Staphylococci SPC* |
|---|---|---|---|---|---|
| 1 | 12 | 2 | uncooked | $1.1 \times 10^7$ | $2.4 \times 10^4$ |
| 2 | 12 | | 136 | <3 | <100 |
| 3 | 11 | 12 | 140 | <3 | <100 |
| 4 | 11 | 2 | 137 | <3 | <100 |
| 5 | 12 | 12 | 140 | <3 | <100 |
| 6 | 11 | 10 | 130 | <3 | <100 |
| 7 | 11 | 10 | 135 | <3 | <100 |
| 8 | 11 | 15 | 130 | 23 | 360 |
| 9 | 11 | 7 | 130 | <3 | <100 |
| 10 | 11 | 7 | 140 | <3 | <100 |
| 11 | 11 | 10 | 130 | <3 | <100 |
| 12 | 12 | 1 | uncooked | $1.1 \times 10^7$ | $4.0 \times 10^4$ |

*Surface Plate Count

TABLE II

| Sample | Weight lbs. | oz. | Temperature °F | Salmonella MPN | Staphylococci SPC* |
|---|---|---|---|---|---|
| 20 | 14 | 10 | uncooked | $1.1 \times 10^6$ | $8.1 \times 10^3$ |
| 21 | 14 | 12 | 136 | <3 | <100 |
| 22 | 15 | 3 | 134 | <3 | <100 |
| 23 | 14 | 13 | 134 | <3 | <100 |
| 24 | 15 | 8 | 134 | <3 | <100 |
| 25 | 14 | 13 | 137 | <3 | <100 |
| 26 | 14 | 12 | 134 | <3 | <100 |
| 27 | 15 | 7 | 140 | <3 | <100 |
| 28 | 15 | 4 | 136 | <3 | <100 |
| 29 | 14 | 3 | 139 | <3 | <100 |
| 30 | 14 | | 139 | <3 | <100 |
| 31 | 15 | 3 | uncooked | $1.5 \times 10^7$ | $8.0 \times 10^4$ |

*Surface Plate Count

TABLE III

| Sample | Weight lbs. | oz. | Temperature °F | Salmonella MPN | Staphylococci SPC* |
|---|---|---|---|---|---|
| A | 12 | 1 | 136 | <3 | <100 |
| B | 11 | 12 | 130 | <3 | <100 |
| C | 11 | 8 | 131 | <3 | <100 |
| X | 15 | 4 | 135 | <3 | <100 |
| Y | 15 | 8 | 137 | <3 | <100 |
| Z | 14 | 12 | 134 | <3 | <100 |

*Surface Plate Count

| | | Total Plate Count | |
|---|---|---|---|
| Pump: | before use | — | <3 | <100 |
| | after 4 | | | |
| | controls | 320 | <3 | <100 |

From the foregoing it will be noted that the tests conclusively establish that beef, which has been cooked according to the subject process, to attain a maximum internal temperature of 131° to 140°F., is a safe product.

Those pieces of beef which attained maximum internal temperatures of 138°F. were rare throughout and were characterized by a beautiful reddish pink color.

When the maximum internal temperature was 140°F. the meat was rare but a bit less pink. When the maximum internal temperature was 142°F. the desired pink color was lost.

What is claimed is:

1. A process of preparing rare roast beef which is safe for human consumption comprising the steps of:
   a. pumping an aqueous solution of water, salt dextrose, and monosodium glutamate into a 10–15.4 pound piece of uncooked beef;
   b. subjecting the pumped beef to deep fat frying to brown and seal the outer surface thereof;
   c. placing the beef within an oven-ready bag;
   d. producing a vacuum within the bag to cause it to adhere to the outer surface of the beef, and thereafter sealing the bag;
   e. cooling the bag-encased beef until it attains an internal temperature of 35°–40°F;
   f. placing the cooled, bag-encased beef in a closed chamber and there subjecting it to live-steam-induced temperatures of 162°–165°F until the internal temperature of the beef attains an intermediate temperature of 128°–134°F;
   g. discontinuing the addition of heat to said chamber without raising the internal temperature beyond the 128°–134°F range;
   h. lowering the temperature of the outer surface of the meat within the bag about 10°F as an intermediate cooling step;
   i. removing the bag-encased meat when, but not before, the internal temperature thereof reaches a final temperature of from 134°–140°F due to the dissipation of residual heat within the bag; and
   j. subjecting the bag-encased product to rapid chilling for reducing the internal temperature of the beef from the range of 134°–140°F.

2. A process as called for in claim 1, which includes the step of applying a prepared spice mixture to the warm, outer surface of the beef between steps (b) and (c).

3. A process as called for in claim 2, wherein the temperature of the outer surface of the meat, as called for in step (h), is effected by subjecting the outer surface of the bag to a water shower for a period of time to lower the surface temperature of the meat therein by 10°F.

4. A process as called for in claim 3, wherein the bag-encased beef is subjected to rapid chilling for reducing the internal temperature of the beef to 40°F., after step (i).

5. A process as called for in claim 1, wherein the piece of uncooked beef constitutes beef top round.

6. A process as called for in claim 1, wherein the pumped beef is permitted to drain before being subjected to step (b) thereof.

7. A process as called for in claim 1, wherein the cooling called for in step (e) occurs over a twelve hour period of time.

8. A process as called for in claim 1, wherein the dissipation of the residual heat as called for in step (i) occurs over a 20-40 minute period of time.

9. A process as called for in claim 3, wherein the water shower is applied to the bag for from 5–7 minutes.

10. A process as called for in claim 3, which includes the additional steps of:
opening the sealed bag after step i and of removing some, but not all, of the au jus therein therefrom; and
re-establishing a vacuum within the bag and of thereafter sealing same about the cooked beef product and au jus remaining in the bag.

11. A process as called for in claim 1, wherein the beef, in step (a), is pumped with up to 6%, by weight, with the aqueous solution.

12. A process as called for in claim 1, wherein the beef, in step (b) is deep fat fried at 370°F. for a period of 30 seconds.

* * * * *